Patented July 20, 1954

2,684,381

UNITED STATES PATENT OFFICE 2,684,381

ESTER AMIDES OF DIALKYLOL AMINES AND ACID CARBONATES

William R. Dial, Akron, Ohio, assignor, by mesne assignments, to Columbia-Southern Chemical Corporation, Pittsburgh, Pa., a corporation of Delaware No Drawing. Application February 2, 1949, Serial No. 74,261

22 Claims. (Cl. 260—463)

This invention relates to a novel class of esters and to their production.

According to the present invention, a novel class of esters which may be regarded as mixed carbamate-carbonates of alkylol amines and monohydric alcohols has been provided. These compounds are esters of (a) lower dialkylol amines and (b) an acid carbonate of a monohydric alcohol which is free from aliphatic unsaturation, wherein both of the hydroxyl groups of (a) are esterified and the imino group of (a) is acylated with the acid carbonate. The contemplated compounds have the following general structure:

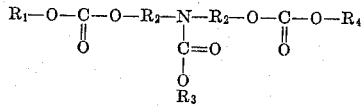

where $R_1$, $R_3$ and $R_4$ are the radicals of the monohydroxy compounds $R_1OH$, $R_3OH$ or $R_4OH$, and $R_2$ is the radical of the alkylol amine $_2[HOR_2]NH$. In this case, $R_1$, $R_3$ and $R_4$ may be the same or different radicals.

These compounds also may be regarded as esters of the theoretical acid:

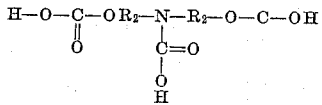

wherein the acid groups are esterified with monohydric alcohol or equivalent compound containing a single hydroxyl group which is esterifiable with acid. These esters may be simple (all of the acid groups are esterified with the same alcohol) or mixed (the acid groups or two of them are esterified with different alcohols).

The products may be prepared by reacting a dialkylol amine with a chloroformate of a monohydric alcohol in amounts sufficient to react with the hydroxy groups and the imino group of the alkylol amine.

According to one convenient method of preparing this novel series of compounds, a liquid pool comprising the dialkylol amine, such as diethanol amine with or without solvent or diluent, is established in a reactor together with a suitable alkali, such as aqueous sodium hydroxide in concentrated form, and the chloroformate is added to the resulting mixture while maintaining the temperature of the reaction mixture below room temperature, for example, 5 to 10° C.

In this process, the initial reaction produces an ester of an N-dialkylol carbamic acid or urethane, which has the structure:

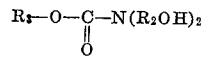

$R_3$ being the radical of the monohydric alcohol, $R_3OH$, and $R_2$ being the radical of the dialkylol amine, $HN(R_2OH)_2$. Further addition of chloroformate to this carbamate produces the ester herein contemplated. It will also be seen that the contemplated esters may be prepared by addition of chloroformate to a pool produced by mixing aqueous sodium hydroxide or like alkaline agent with previously prepared carbamate ester of the type described above.

According to an alternative process, the alkylol amine, such as diethanol amine, may be added to the chloroformate of the monohydric alcohol while maintaining the temperature below room temperature, for example, 5 to 10° C. By this means, the imino group of the alkylol amine is reacted with the chloroformate to produce the carbamate mentioned above. Thereafter, a suitable alkaline agent, such as aqueous sodium hydroxide, is added by any convenient method capable of distributing the caustic through the reaction mixture. In this case, the addition of caustic is held at a slow rate in order to prevent the reaction temperature from exceeding about 10 to 15° C.

In order to achieve maximum yields, it is generally desired to use chloroformate and the alkaline agent in excess of that theoretically required.

After the reaction has been completed, the reaction mixture is worked up in order to separate the carbonate-carbamate which is prepared. This may be done, for example, by adding a suitable organic solvent which is capable of diluting the mixture and of dissolving the carbamate-carbonate, agitating the mixture for a short time in order to ensure distribution of the solvent, and then permitting the solvent together with the carbamate-carbonate to separate as a layer from the aqueous mixture. Suitable solvents for this purpose include ether, benzene, xylene, toluene, and like organic solvents which are essentially immiscible with water.

Following recovery of the oil layer, the oil is treated to remove acid components, such as excess chloroformate or hydrogen chloride, by neutralizing with pyridine or other alkaline agent, washing with acid and then with alkali in the manner conventionally used to purify esters. Thereafter, the ester may be heated under a low absolute pressure, in order to drive off volatile solvents and to leave the high boiling carbamate-carbonate.

Compounds of the type contemplated herein may be prepared from various dialkylol amines, such as the lower dialkylol amines in which the radicals thereof contain up to 5 or 10 carbon atoms in each radical. Such compounds include diethanol amine, diisobutanol amine, di-n-propanol amine, diisopropanol amine, di-n-butanol amine, diamylol amine, etc., and also include the dialkylol amines corresponding to octyl and nonyl alcohols and like alcohols up to 10 carbon atoms.

The invention is particularly concerned with the carbamate-carbonates of lower aliphatic saturated monohydric alcohols containing up to 10 carbon atoms. Thus, the invention contemplates esters of methanol, ethanol, n-propanol, n-butanol, isopropanol, isobutanol, secondary butanol, tertiary butanol, amyl alcohol, 2-ethyl hexyl alcohol, n-octyl alcohol, etc. The invention also contemplates esters of cyclic aliphatic and aromatic hydroxy compounds containing up to 10 carbon atoms and containing an alcoholic hydroxyl (hydroxyl capable of being esterified with acid), and which are free from aliphatic unsaturation, including carbonates and carbamates of phenol, cyclohexanol, 2-methyl cyclohexanol, benzyl alcohol, etc. Furthermore, esters of various substituted alcohols including 2-chloroethyl alcohol, 2-nitrobutanol-1, 2-nitro 2-methyl propyl alcohol, 2-bromoethyl alcohol, 2-butoxyethyl alcohol, 2-ethoxy ethanol, 2-fluoroethanol, 2,2,2-trichloroethanol-1, ortho, meta or para nitrobenzyl alcohol; ortho, meta or para nitro phenol; ortho, meta or para chlorophenol; methyl lactate, methyl salicylate, etc., or other alcohol or hydroxy compound capable of reacting with phosgene to produce a chloroformate, are within the contemplation of this invention. Esters of higher alcohols including lauryl alcohol, stearyl alcohol and like alcohols which contain up to 20 carbon atoms, also may be prepared.

The carbamate-carbonates may be mixed or simple. That is, they may be prepared from one or from more than one alcohol. For example, a simple carbamate-carbonate may be prepared by reaction of 1 mole of dialkylol amine with 3 moles of a chloroformate of the monohydric alcohol. On the other hand, a mixed carbamate-carbonate may be prepared by reacting a dialkylol amine with a chloroformate in the proportion of mole to mole. In such a case, the chloroformate reacts with the imino group to form the corresponding carbamate, leaving the hydroxyl groups essentially unesterified. Thereafter, a different chloroformate or a mixture of different chloroformates may be added to the mixture in the presence of caustic or other suitable alkaline agent and the hydroxyl groups thus esterified to produce the mixed compound.

The compounds herein contemplated are generally high boiling liquids, although some may be waxy solids. These compounds are quite stable on heating, and do not hydrolyze readily. They may be effectively used as plasticizers for synthetic resins. For example, they are compatible with vinyl resins, including polymers and copolymers of vinyl chloride, vinyl acetate, styrene, methyl methacrylate, ethyl methacrylate, ethyl chloracrylate, etc. Furthermore, these compounds may be used to plasticize numerous other plastic compositions, including cellulose acetate, polyethylene, polybutene, ethyl cellulose, nitrocellulose, cellulose acetobutyrate, phenol-aldehyde resins, urea-aldehyde resins, casein resins, nylon, alkyd resins, etc.

The following examples are illustrative:

EXAMPLE I

*N,N-bis[2 (butyl carbonyl dioxy) ethyl]O-2-ethyl hexyl carbamate*

A two-liter flask containing 105 grams (1 mole) of diethanol amine and 80 grams (1 mole) of aqueous sodium hydroxide solution containing 50% by weight of NaOH, was fitted with a thermometer, stirrer, dropping funnel and reflux condenser. The flask and its contents were cooled to 5° C. and 195.4 grams (1 mole+1½% of excess) of 2-ethyl hexyl chloroformate was slowly added while maintaining the temperature at 5° C. After the addition was complete, the mixture was stirred for ½ hour. Thereupon 286.7 grams (2 moles+5% excess) of n-butyl chloroformate was rapidly added, while maintaining the temperature of the mixture at 5° C. Then, 176 grams (2 moles+10% excess) of aqueous sodium hydroxide solution containing 50% by weight NaOH, was slowly added while maintaining the temperature at 5° C., and after addition was complete, the mixture was allowed to stand with stirring for 1 hour.

The resulting ester was extracted by washing the mixture with 1 liter of benzene and was washed twice with equal volumes of an aqueous solution containing 5% by weight of pyridine, twice with aqueous 5% HCl solution, twice with 5% aqueous sodium bicarbonate solution and finally with water, until the product was neutral.

The solvent was distilled out and the product heated in the presence of 0.5% by weight of decolorizing carbon to 160° C., at 3 millimeters of mercury.

After filtering, 398 grams of a liquid product having a faint yellow color was recovered. This product has an index of refraction, $N_D^{20}$, of 1.4518, a specific gravity 20/4° C. of 1.036 and a viscosity at 20° C. of 11.2 centistokes. The product has the following formula:

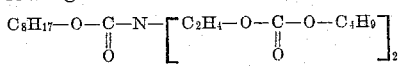

EXAMPLE II

*N,N-bis[2-(n-octyl carbonyl dioxy) ethyl]O-n-octyl carbamate*

The process of Example I was repeated, using 3 moles of n-octyl chloroformate per mole of diethanol amine. In this case, the octyl chloroformate was added to a mixture of 105 grams of diethanol amine and 80 grams of aqueous sodium hydroxide containing 50% by weight of NaOH. The time required to complete the addition of 192.5 grams of the octyl chloroformate was 2 hours and 15 minutes. The reaction temperature during this period was maintained between 0 to 5° C. After this addition, the mixture was stirred for ½ hour, and 423.5 grams of n-octyl chloroformate was added and the mixture chilled to 0 to 5° C. Thereupon, 2.2 moles of sodium hydroxide as aqueous solution containing 50% NaOH was added by spraying the caustic into the mixture. The total time required for the caustic addition was 2 hours. Following the addition, the mixture was stirred for ½ hour, 550 milliliters of benzene was added to the mixture, and the oil was separated and recovered as in Example I.

The product obtained was a clear, lemon yellow colored liquid having the characteristic sweet octyl odor. Approximately a 95% yield was obtained. This ester has a specific gravity of 0.986, a refractive index, $N_D^{20}$ of 1.4534 and a viscosity at 20° C. of 101 centistokes. The product has the following structure:

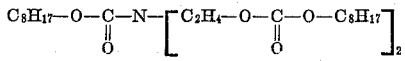

Other esters may be prepared in a similar manner by substituting phenyl chloroformate, benzyl chloroformate, cyclohexyl chloroformate or the chloroformate of ethyllactate for octyl chloroformate in this example.

EXAMPLE III

*N,N-bis[2-(n-hexyl carbonyl dioxy) ethyl]-O-n-hexyl carbamate*

The process of Example II was repeated, using n-hexyl chloroformate. In this case, 115.6 grams of diethanol amine was reacted with 181.0 grams of n-hexyl chloroformate in the presence of 44.0 grams of sodium hydroxide as an aqueous solution containing 50% NaOH and 80 milliliters of water. The time required for this reaction was 1 hour and 20 minutes. Thereafter, 398.1 grams of n-hexyl chloroformate was added to the product and 96.8 grams of aqueous 50% sodium hydroxide solution was sprayed into the mixture over a period of 2 hours and 5 minutes. The resulting carbonate-carbamate was recovered by addition of benzene, distillation and topping, as in Examples I and II, at a temperature of 154° C. at 2 millimeters pressure.

The product thus obtained is a light yellow colored liquid, having a refractive index, $N_D^{20}$, of 1.4503, a specific gravity at 20° C. of 1.018 and a viscosity at 20° C. of 79.6 centistokes. The product has the following formula:

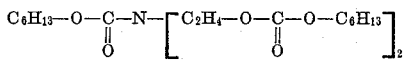

EXAMPLE IV

*N,N-bis[2-(n-butyl carbonyl dioxy) ethyl]-O-n-butyl carbamate*

One hundred five (105) grams of diethanol amine and 80 grams of aqueous sodium hydroxide containing 50% by weight of NaOH was introduced into a two-liter, three-necked flask, fitted with a stirrer, thermometer and dropping funnel for the addition of n-butyl chloroformate. This mixture when chilled to 0 to 5° C. became exceedingly stiff and therefore 80 milliliters of water was added to thin the mixture in order to permit good stirring. 136.6 grams of n-butyl chloroformate was added with stirring, over a 2 hour and 15 minute period, to the mixture while maintaining the temperature of the mixture below 5° C. The resulting mixture which was a rather thin, white slurry was allowed to stand at temperature overnight. Thereupon, 300.5 grams of n-butyl chloroformate was added while maintaining the temperature of the mixture at 0 to 5° C. by means of an ice-salt bath. When the addition was complete, 176 grams of aqueous sodium hydroxide solution containing 50% NaOH was sprayed into the mixture while stirring vigorously, over a period of 1 hour and 10 minutes. After the addition was complete, the mixture was stirred for 1 hour before warming to room temperature.

The product was mixed with 500 milliliters of benzene and the oil phase was washed successively with two 800 milliliter portions of 5% aqueous pyridine, two 800 milliliter portions of 5% aqueous hydrochloric acid solution, one 800 milliliter portion of 2% aqueous sodium bicarbonate solution and one 800 milliliter portion of water. The washed product was topped in the presence of 1% by weight of decolorizing carbon, to a temperature of 155° C. at 2 to 3 millimeters of mercury.

The resulting product is a nearly colorless liquid containing very small traces of chlorine as an impurity and having a refractive index $N_D^{20}$, of 1.4485, a specific gravity at 20° C. of 1.072 and a viscosity at 20° C. of 70.0 centistokes. The product has the following formula:

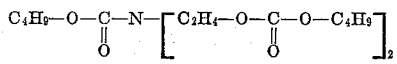

EXAMPLE V

*N,N bis[2-(n-amyl carbonyl dioxy) ethyl] O-n-amyl carbamate*

The process of Example IV was repeated, using n-amyl chloroformate in which, in the first step of the reaction, 135.5 grams of n-amyl chloroformate was reacted with 94.6 grams of diethanol amine in the presence of 36 grams of sodium hydroxide as 48 milliliters of a 50% aqueous NaOH solution and 100 milliliters of water. One hour and a half was required to complete the addition of the reactants, during which the reaction mixture remained at about 6° C. Thereafter, 298 grams of n-amyl chloroformate was added and 79.2 grams of sodium hydroxide as 106 milliliters of 50% NaOH solution was added, over a period of one hour while maintaining the temperature at about 7° C. The oil phase was dissolved in 300 milliliters of benzene and washed successively with 400 milliliters of 5% aqueous pyridine, 400 milliliters of 5% aqueous hydrochloric acid, 400 milliliters of aqueous 5% sodium bicarbonate solution and two 400 milliliter portions of water. Thereafter, the product was topped by heating to a temperature of 157° C. at 2 to 3 millimeters of mercury, in the presence of decolorizing carbon.

The product is a clear, lemon yellow colored liquid having a refractive index $N_D^{20}$, of 1.4495, a specific gravity at 20° C. of 1.044 and a viscosity at 20° C. of 77.1 centistokes. This product has the following structure:

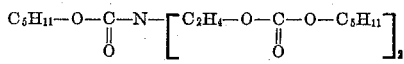

EXAMPLE VI

The process of Example V was repeated, using a commercial mixture of amyl chloroformates prepared from "pentasol" which is a mixture of the five isomeric amyl alcohols, 1-pentanol, 3 methyl-1 butanol, 2 methyl-1 butanol, 2-pentanol and 3-pentanol.

The product obtained had a refractive index, $N_D^{20}$, of 1.4488, a specific gravity 20/4° C. of 1.041. and a viscosity at 20° C. of 125.9 centistokes.

EXAMPLE VII

A two-liter flask containing 105 grams of diethanol amine and 80 grams of aqueous sodium hydroxide, containing 50% by weight of NaOH, was fitted with a thermometer, stirrer, dropping funnel and condenser. The flask and contents were chilled to 5° C. and 195.4 grams of 2-ethyl hexyl chloroformate was slowly added while maintaining the mixture at a temperature of 5° C. After the addition, the mixture was stirred for one-half hour and 286.7 grams of butyl chloroformate was rapidly added while maintaining the temperature at 5° C. Then 176 grams of 50% aqueous NaOH solution was slowly added while maintaining the reaction temperature below 5° C. and the mixture, after the addition, was allowed to stand with stirring for a period of one hour. The product was extracted with 1 liter of benzene and washed as follows: twice with equal volumes of 5% aqueous pyridine, twice with equal volumes of 5% aqueous hydrochloric acid solution, twice with equal volumes of 5% aqueous sodium bicarbonate solution and finally with water, until neutral. The solvent was distilled out and the product was heated in the presence of 0.5% by weight of decolorizing carbon to 160° C. at 3 millimeters pressure.

This product is a light yellow liquid having a refractive index, $N_D^{20}$, of 1.4518, a specific gravity 20/4° C. of 1.036 and a viscosity at 20° C. of 11.2 centistokes. This ester has the following composition:

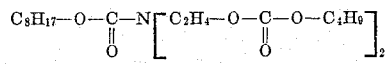

EXAMPLE VIII

The process of Example III was repeated using 1 mole of diisopropanolamine, 3.5 moles of n-butyl chloroformate, 3.5 moles of sodium hydroxide and 80 milliliters of water. The total reaction time was 2.4 hours. The mixture was topped at 150° C. and 3 millimeters of mercury. This compound has the following formula:

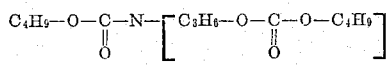

This ester has a refractive index, $N_D^{20}$, of 1.4472, a specific gravity of 1.038 and a viscosity at 20° C. of 177 centistokes.

EXAMPLE IX

The process of Example IV was repeated using isobutyl chloroformate in lieu of the n-butyl chloroformate. In this process, 1 mole of diethanol amine was reacted with 3.2 moles of isobutyl chloroformate in the presence of 3.2 moles of sodium hydroxide as 50% NaOH solution and 80 milliliters of water. The product was topped at 154° C. at 2 millimeters of mercury. This ester has a refractive index $N_D^{20}$, of 1.4449, a specific gravity at 20° C. of 1.060 and a viscosity at 20° C. of 238 centistokes.

EXAMPLE X

The process of Example IX was repeated using secondary butyl chloroformate in lieu of isobutyl chloroformate. In this case, 1 mole of diethanol amine was reacted with 3.3 moles of the chloroformate in the presence of 3.2 moles of sodium hydroxide as 50% aqueous NaOH solution and 80 milliliters of water. Two hours was required to complete the reaction and the product after washing was topped at 158° C. under a pressure of 3 millimeters of mercury.

The product is a greenish colored liquid, having a refractive index $N_D^{20}$, of 1.4439, a specific gravity at 20° C. of 1.058 and a viscosity at 20° C. of 184 centistokes.

EXAMPLE XI 0.765 moles of n-propyl chloroformate was placed in a reaction flask fitted with a stirrer, reflux condenser and thermometer. The temperature of the flask and contents was reduced to 5 to 10° C. and 0.212 moles of diethanol amine was slowly added while holding the temperature of the mixture at 5–10° C. Following this, 0.892 moles of aqueous sodium hydroxide solution containing 50% by weight of NaOH was sprayed into the mixture at a slow rate with the temperature of the mixture being maintained at 5–10° C. The resulting mixture was extracted with benzene and the oil phase was washed as described in Example I. Thereafter, the solvent was distilled off and the product was topped at 160° C. under a pressure of 3 millimeters of mercury. The product is an essentially colorless liquid having an index of refraction at 20° C. of 1.4445.

The same product was prepared by the method of Example III, using 3.5 moles of chloroformate, 3.5 moles of sodium hydroxide as an aqueous solution containing 50% by weight of NaOH, and 45 milliliters of water. This product was topped at 158° C. for 2 hours. The ester thus obtained had an index of refraction $N_D^{20}$, of 1.4480, a specific gravity at 20° C. of 1.118 and a viscosity at 20° C. of 96.6 centistokes.

In the above examples, it will be noted that an excess of chloroformate normally was used in order to ensure production of the compound in high yield. It should be understood that lower proportions of chloroformate may be used to form the same ester since the reaction proceeds in the proportion of 3 moles of chloroformate per mole of dialkylol amine after the imino group has been imidated, even when less than stoichiometric amounts of chloroformate are added to the dialkylol amine in the presence of an alkaline agent. However, it is rarely practical to add chloroformate to dialkylol amine in proportion less than 2 to 2.5 moles per mole of dialkylol amine.

In lieu of sodium hydroxide used as the alkaline agent in the esterification described above, it will be understood by those skilled in the art that other alkaline agents which are capable of taking up evolved hydrogen chloride may be used. For example, calcium hydroxide, calcium carbonate, potassium hydroxide, sodium carbonate, sodium bicarbonate, pyridine and like alkaline reagents, such as other alkali metal or alkaline earth metal carbonates, bicarbonates or hydroxides, may be used for this purpose.

In the above examples, the process utilized has involved the production of a urethane or carbamate having the structure

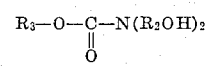

as described. Obviously, this compound may be prepared in a previous operation and reacted with chloroformate according to methods herein described. In such a case, the chloroformate reacts with the carbamate to produce the contemplated ester. For complete reaction, 2 moles of chloroformate are added to the dialkylol carbamate. Somewhat smaller amounts of chloroformate may be used, although smaller yields are obtained. Hence, it is rare that less than 1 to 1.5 moles of chloroformate per mole of carbamic ester is used.

As previously stated, the esters herein contemplated may be used effectively as plasticizers. In this connection, the esters of aliphatic saturated alcohols containing 4 to 10 carbon atoms have been found to be particularly effective for use in vinyl resins, such as polyvinyl chloride and copolymers of vinyl chloride and other polymerizable materials wherein vinyl chloride is the preponderant polymerizable component. Polyvinyl chloride resins plasticized with these esters have been found to be advantageous because of their superior compatibility, resistance to attack by water and soap solutions, and heat. The amount of ester used is capable of some variation depending upon the properties desired, but in general will be within the range of 10 to 100 parts of ester per 100 parts of resin or plastic.

Although the present invention has been described with reference to specific details of certain embodiments, it is not intended that such details shall be regarded as limitations upon the scope of the invention since the invention is limited only by the scope of the ensuing claims.

What is claimed:

1. An ester-amide of (a) a lower dialkylol amine and (b) an acid carbonate of a monohydroxy compound, said monohydroxy compound having a single hydroxy group which is esterifiable with acids and being free from aliphatic unsaturation; wherein both hydroxyl groups of (a) are esterified and the imino group of (a) is acylated with (b).

2. An ester-amide of (a) diethanol amine and (b) an acid carbonate of a compound having a single hydroxy group which is esterifiable with acids and being free from aliphatic unsaturation; wherein both hydroxyl groups of (a) are esterified and the imino group of (a) is acylated with (b).

3. A monohydric alcohol ester of the acid

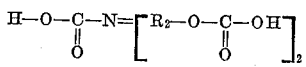

where $R_2$ is a divalent aliphatic hydrocarbon radical of the diloweralkylol amine

and the monohydric alcohol is a lower saturated aliphatic alcohol containing up to 8 carbon atoms, all of the carboxy groups of said acid being esterified with alcohol.

4. The method of preparing an ester which comprises mixing a dialkylol amine with a chloroformate of a monohydroxy compound, in the proportion of 3 moles of chloroformate per mole of dialkylol amine and in the presence of an hydrogen chloride acceptor.

5. The method of preparing an ester which comprises mixing a chloroformate of a monohydroxy compound with a dialkylol amine in mole to mole proportions whereby to produce the corresponding dialkylolcarbamate ester and reacting said carbamate ester with a chloroformate of a monohydric compound in the proportion of two moles of chloroformate per mole of carbamate ester in the presence of an hydrogen chloride acceptor.

6. The process of claim 5 wherein the monohydroxy compound is a saturated aliphatic alcohol, the radical of which is hydrocarbon.

7. A method of preparing an ester which comprises mixing an ester of an N-dialkylol carbamic acid with a chloroformate of a monohydric compound, in the presence of an hydrogen acceptor.

8. A method of preparing an ester which comprises reacting an ester of an N-diethanol carbamic acid with a chloroformate of a monohydric alcohol, in the presence of an hydrogen chloride acceptor.

9. The process of claim 8 wherein the monohydric alcohol is a saturated aliphatic alcohol, the radical of which is hydrocarbon.

10. An ester-amide of (a) diethanol amine and (b) an acid carbonate of an aliphatic monohydric alcohol containing up to 10 carbon atoms; wherein both hydroxy groups of (a) are esterified and the imino group of (a) is acylated with (b).

11. An ester of a monohydric alcohol, which is free from alphatic unsaturation, and the acid:

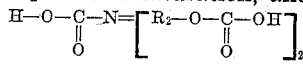

where $R_2$ is a divalent aliphatic hydrocarbon radical of the di-lower alkylolamine

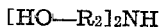

wherein all of the acid groups of said acid are esterified with said alcohol.

12. An ester of a monohydric alcohol, which is free from aliphatic unsaturation, of the acid:

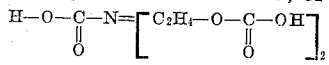

wherein all of the acid groups of said acid are esterified with said alcohol.

13. A monohydric alcohol ester of the acid

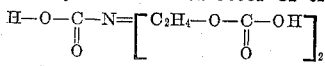

and a monohydric saturated aliphatic alcohol containing up to 8 carbon atoms, wherein all of the acid groups of said acid are esterified with said alcohol.

14. The ester of claim 11 wherein the monohydric alcohol is a saturated alcohol.

15. An ester of a monohydroxy compound which is free from aliphatic unsaturation of the acid:

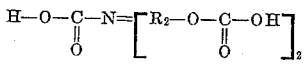

where $R_2$ is the divalent aliphatic hydrocarbon radical of the dilower alkylolamine

wherein all of the acid groups of said acid are esterified with the hydroxy compound.

16. An ester of a monohydroxy compound which is free from aliphatic unsaturation of the acid:

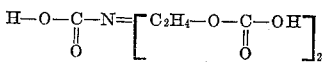

wherein all of the acid groups of said acid are esterified with the hydroxy compound.

17. The ester of claim 16 wherein the monohydroxy compound is a saturated aliphatic alcohol.

18. The ester of claim 11 wherein the monohydric alcohol is a saturated aliphatic alcohol.

19. N,N-bis [2-(n-octyl carbonyl dioxy) ethyl] O-n-octyl carbamate.

20. N,N-bis [2-(n-amyl carbonyl dioxy) ethyl] O-n-amyl carbamate.

21. N,N-bis [2-(n-butyl carbonyl dioxy) ethyl] O-n-2-ethyl hexyl carbamate.

22. The method of preparing an ester which comprises mixing a chloroformate of a monohydroxy compound containing up to 10 carbon atoms with a dialkylol amine the alkyl radicals of which contain up to 10 carbon atoms in mole to mole proportions whereby to produce the corresponding dialkylol carbamate ester, and reacting said carbamate ester with a chloroformate of a monohydroxy compound containing up to 10 carbon atoms in the proportion of two moles of chloroformate per mole of carbamate ester in the presence of an hydrogen chloride acceptor.

References Cited in the file of this patent

UNITED STATES PATENTS

| Number | Name | Date |
|---|---|---|
| 2,041,265 | Orthner et al. | May 19, 1936 |
| 2,182,359 | Smith et al. | Dec. 5, 1939 |
| 2,379,249 | Muskat | June 26, 1945 |
| 2,403,113 | Musket et al. | July 2, 1946 |